US012693966B2

(12) United States Patent
Aga et al.

(10) Patent No.: US 12,693,966 B2
(45) Date of Patent: Jul. 28, 2026

(54) METHOD AND APPARATUS FOR EFFICIENT MEMORY SETTING

(71) Applicant: Advanced Micro Devices, Inc., Santa Clara, CA (US)

(72) Inventors: Shaizeen Dilawarhusen Aga, Santa Clara, CA (US); Vignesh Adhinarayanan, Austin, TX (US); Nuwan S. Jayasena, Cupertino, CA (US); Brandon Woolley, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/900,769

(22) Filed: Sep. 29, 2024

(65) Prior Publication Data

US 2026/0093616 A1 Apr. 2, 2026

(51) Int. Cl.
*G06F 12/00* (2006.01)
*G06F 12/02* (2006.01)

(52) U.S. Cl.
CPC ................................ *G06F 12/0223* (2013.01)

(58) Field of Classification Search
CPC .................................................. G06F 12/0223
See application file for complete search history.

(56) References Cited

U.S. PATENT DOCUMENTS

| | | | | |
|---|---|---|---|---|
| 5,818,602 A | * | 10/1998 | Nakajima | .......... H04N 1/00602 |
| | | | | 358/401 |
| 2011/0289294 A1 | * | 11/2011 | Maeda | ................ G06F 12/1491 |
| | | | | 711/163 |
| 2025/0133136 A1 | * | 4/2025 | Barak | ................... G06F 13/404 |

FOREIGN PATENT DOCUMENTS

JP H0670443 A * 3/1994

OTHER PUBLICATIONS

Aga, Shaizeen , et al., "Co-ML: a Case for Collaborative ML Acceleration using Near-data Processing", Proceedings of the International Symposium on Memory Systems [retrieved May 27, 2022]. Retrieved from the Internet <https://doi.org/10.1145/3357526. 3357532>, Sep. 30, 2019, 12 pages.

(Continued)

*Primary Examiner* — Shawn X Gu
*Assistant Examiner* — Mohammad S Hasan
(74) *Attorney, Agent, or Firm* — FIG. 1 Patents

(57) ABSTRACT

Systems and techniques for efficient memory setting are described. Memory setting is a common operation used by computing systems (e.g., operating systems and hypervisors) to write specific values, such as all ones or all zeroes, to obscure the current memory values to a memory region. In one example, a processor core issues a data-less write request that identifies a target address range for setting to a set value (e.g., ones, zeroes, or a random combination thereof). The data-less write request generally does not include a data payload. Instead, the set value is determined based on an index value associated with a lookup table at the memory controller or memory system or based on the target address range. In this way, the described systems and techniques accelerate memory setting operations with minimal data movement to save energy.

20 Claims, 6 Drawing Sheets

400 ⟍

(56) References Cited

OTHER PUBLICATIONS

Kim, Suk Min , et al., "Imbalance-tolerant bit-line sense amplifier for dummy-less open bit-line scheme in dram", IEEE Transactions on Circuits and Systems I: Regular Papers 68, No. 6, 2021, 9 pages.

Lim, Kyu-Nam , et al., "A 1.2 V 23nm 6F 2 4Gb DDR3 SDRAM with local-bitline sense amplifier, hybrid LIO sense amplifier and dummy-less array architecture", In 2012 IEEE International Solid-State Circuits Conference, 2012, 3 pages.

Seshadri, Vivek , et al., "RowClone: fast and energy-efficient in-DRAM bulk data copy and initialization", MICRO-46: Proceedings of the 46th Annual IEEE/ACM International Symposium on Microarchitecture [retrieved Nov. 17, 2023]. Retrieved from the Internet <https://doi.org/10.1145/2540708.2540725>, Dec. 2013, 13 pages.

* cited by examiner

METHOD AND APPARATUS FOR EFFICIENT MEMORY SETTING

BACKGROUND

Computing systems use memory setting to prevent data leakage when memory blocks (e.g., pages) are reassigned between processes or virtual machines. Memory setting involves writing a value (e.g., a predetermined or set value) to the reassigned memory locations to hide the values those locations currently hold. Memory setting is typically done using memory write operations, which leads to significant data movement, long latency, and high energy overhead.

DETAILED DESCRIPTION

Figure 1:
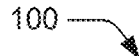
FIG. 1 is a block diagram of a non-limiting example system having a device with a processor and memory system to implement techniques for efficient memory setting.
Figure 1:
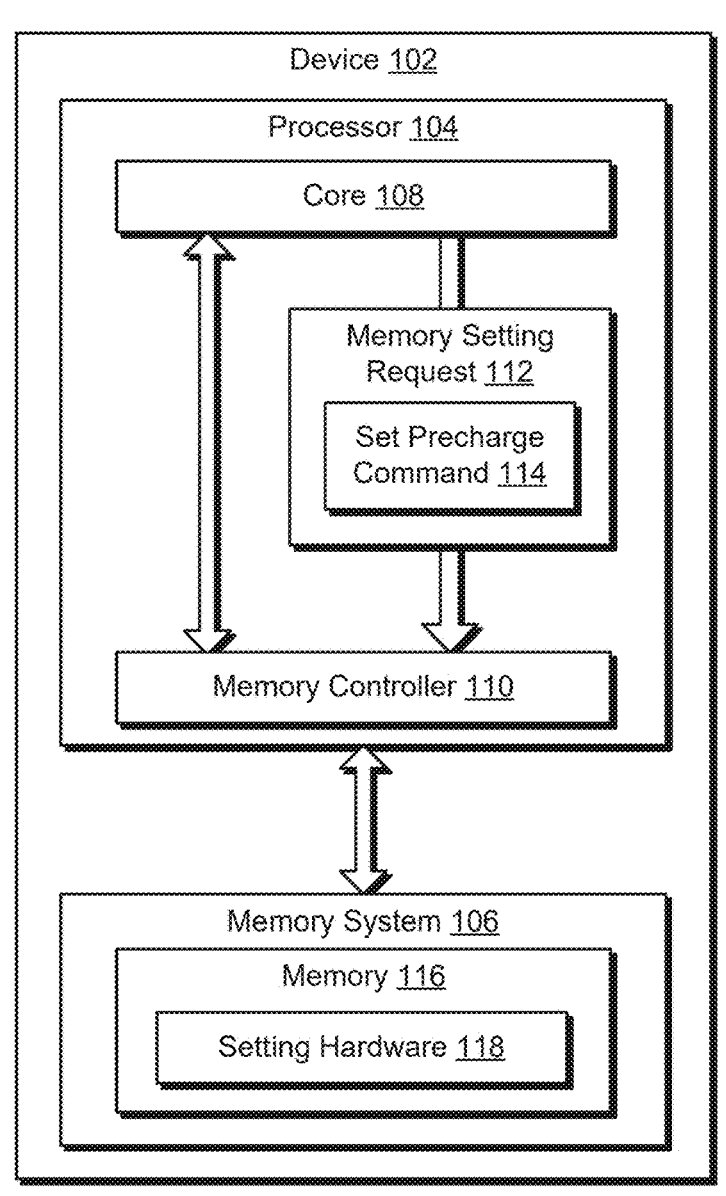

Memory setting is a common operation used by various computing systems such as operating systems, hypervisors, virtual machine monitors, and runtime systems. Memory setting involves writing a specific value (e.g., zeroes or ones) to obscure the current memory values to a specified memory range. One example is memory zeroing, where zeroes are written to memory pages by an operating system to ensure security when reallocating those pages to different processes. Some conventional techniques for memory setting require including a set value (e.g., zeroes) as the data payload, resulting in significant data movement across the system. This data movement causes long latency and adds to the energy overhead of the memory setting operation.

Other conventional techniques speed up the memory setting process using a row cloning operation. Read and write operations in dynamic random-access memory (DRAM) involve pre-charging and row activation of a specific row. Initially, the baseline pre-charging process sets bit lines in a memory array to half the supply voltage ($\frac{1}{2}$ VDD). After pre-charging, to access data in a specific row, the row is activated by raising the word line, which connects the bit cells in the row to the bit lines, causing a voltage change. Sense amplifiers then amplify the voltage change while driving back the bit cells. After a set amount of time (e.g., tRCD), the sense amplifiers and bit lines reach a stable state, and the memory controller carries out read or write operations to specified portions of the memory row.

Row cloning uses this mechanism to activate two rows in succession, allowing the data from the first row to overwrite the second row. This cloning process requires a specific row to be set aside or written with set values, but it reduces or eliminates data movement over a system on chip (SoC) to accomplish memory setting.

Another technique to accelerate memory setting utilizes processing-in-memory (PIM). PIM involves adding arithmetic logic units (ALUs) near memory banks, allowing the same command to be simultaneously broadcast to multiple memory banks. In such a design, memory setting is achievable by programming registers in near-bank ALUs with the set value and leveraging multiple-bank or all-bank simultaneous broadcasts. Row cloning can also utilize such broadcasts to accelerate memory-setting operations. Like row cloning, PIM commands do not require data movement over the SoC. While they avoid heavy-weight data movement, these conventional techniques still leave performance and energy savings untapped.

In contrast, the described techniques and systems further accelerate memory setting using specialized precharge commands and data-less write operations. Instead of including the precharge values as the payload of a write operation, the described techniques utilize a look-up table in the memory controller or memory system of different precharge mask values to write to designated memory addresses. An index identifier in the data-less write request or a selection by the memory controller determines the mask values to write to the designated addresses. In this way, the described techniques and systems provide considerable acceleration of memory setting, minimize or avoid data movement for memory setting to further accelerate the process and save energy, and are interoperable with emerging disruptive technologies, including processing-in-memory. In addition, the described techniques are leveraged to provide an inexpensive solution to guard against cold-boot attacks and render them useless.

In some aspects, the techniques described herein relate to a system that includes a processor core configured to transmit a write request to set targeted addresses in memory to a set value, the write request not including a data payload for the set value.

In some aspects, the techniques described herein relate to a system wherein: the system further comprises a memory controller communicatively coupled to the processor core, the memory controller including a set value lookup (SVL) table with multiple set value options, and the write request includes a SVL index associated with the SVL table to identify the set value.

In some aspects, the techniques described herein relate to a system wherein the SVL table is partitioned by address ranges or processor core identifications.

In some aspects, the techniques described herein relate to a system wherein the memory controller is configured to combine multiple write requests with contiguous targeted addresses into a set precharge command to the memory.

In some aspects, the techniques described herein relate to a system wherein the set value equals a random combination of ones and zeroes.

In some aspects, the techniques described herein relate to a system wherein the set value is configurable by an operating system or application running on the processor core via an application programming interface (API).

In some aspects, the techniques described herein relate to a system wherein: the targeted addresses include one or more complete rows in the memory, and the write request causes the memory to issue at least one row-wide set precharge operation with the set value.

In some aspects, the techniques described herein relate to a memory system that includes a memory configured to store data, and a state machine configured to set each bitcell in a targeted address range of the memory to a set value in response to a set precharge command.

In some aspects, the techniques described herein relate to a memory system wherein the set precharge command is issued in response to detecting a power-on cycle of the memory system.

In some aspects, the techniques described herein relate to a memory system wherein the set precharge command is issued in response to receiving a set precharge command from a memory controller communicatively coupled in between the memory system and a processor core that issues a write request that does not include the set value in a data payload.

In some aspects, the techniques described herein relate to a memory system wherein the targeted address range includes each row in each bank of the memory.

In some aspects, the techniques described herein relate to a memory system wherein the state machine is further configured to issue different set values for different regions of the memory.

In some aspects, the techniques described herein relate to a memory system wherein the memory system includes the state machine for each channel, each bank, or each sub-array of the memory.

In some aspects, the techniques described herein relate to a memory system wherein a memory controller communicatively coupled to the memory system is configured to block or delay access requests to the memory during performance of the set precharge command.

In some aspects, the techniques described herein relate to a memory system wherein a processing-in-memory component simultaneously broadcasts the set precharge command to multiple regions of the memory.

In some aspects, the techniques described herein relate to a memory system wherein the set value equals a random combination of ones and zeroes.

In some aspects, the techniques described herein relate to a device that includes a memory controller configured to receive, from a processor core communicatively coupled to the memory controller, a write request to set targeted addresses in a memory to a set value, the write request including an index indicating the set value and not including a data payload, and issue, to a memory system with the memory based on the index, a set precharge command to set the targeted addresses to the set value.

In some aspects, the techniques described herein relate to a device wherein: the memory controller includes a set value lookup (SVL) table with multiple set value options and the index identifying the set value from among the multiple set value options in the SVL table.

In some aspects, the techniques described herein relate to a device wherein the set precharge command is issued in response to detecting a power-on cycle of the memory system.

In some aspects, the techniques described herein relate to a device wherein the memory controller is further configured to combine multiple write requests with contiguous targeted addresses into a set precharge command to the memory.

FIG. 1 is a block diagram of a non-limiting example system 100 having a device with a processor and memory system to implement techniques for efficient memory setting. Specifically, system 100 depicts a device 102 that includes a processor 104 and a memory system 106 communicatively coupled with one another (e.g., via at least one bus structure, via a network-on-chip, or any type of interconnect that enables transfer of data between various system components described herein).

The techniques described herein are usable by a wide range of device configurations, including, by way of example and not limitation, computing devices, servers, mobile devices (e.g., wearables, mobile phones, tablets, laptops, augmented-reality devices, virtual-reality devices, headsets), processors (e.g., graphics processing units, central processing units, and accelerators), digital signal processors, machine-learning inference accelerators, disk array controllers, hard disk drive host adapters, memory cards, solid-state drives, wireless communications hardware connections, automotive computers, Ethernet hardware connections, switches, bridges, network interface controllers, and other apparatus configurations. Additional examples include artificial intelligence training accelerators, cryptography and compression accelerators, network packet processors, and video coders and decoders.

The processor 104 includes at least one core 108, which may also be called a processing core. The core 108 is an electronic circuit (e.g., an integrated circuit) that performs various operations on or using data in the memory system 106. Example configurations of the processor 104 and core 108 include, but are not limited to, an arithmetic-logic unit (ALU), a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), including adding data, moving data, performing computations on data, and branching. Although one core 108 is depicted in the illustrated example, in other variations, the processor 104 includes more than one core 108 (e.g., a multi-core processor).

The processor 104 also includes a memory controller 110, which is a digital circuit (e.g., implemented in hardware) that manages the flow of data to and from the memory system 106. In some implementations, the memory controller 110 is communicatively located between and interfaces with the core 108 and the memory system 106. By way of example, the memory controller 110 includes logic to read and write to the memory system 106. For instance, the memory controller 110 receives access instruction or other instructions (e.g., a memory setting request 112) from the core 108. Access instructions involve accessing data stored in memory 116 of the memory system 106 and providing the data to the core 108 (e.g., for processing by the core 108).

The memory system 106 is implemented as a printed circuit board, on which memory 116 (e.g., physical memory) is placed (e.g., via physical and communicative coupling using one or more sockets). In other words, the memory 116 is mounted on a printed circuit board, and this construction, along with the communicative couplings (e.g., control signals and buses) and one or more sockets integral to the printed circuit board, form the memory system 106. Examples of the memory system 106 include, but are not limited to, a TransFlash memory system, a single in-line memory module (SIMM), a dual in-line memory module (DIMM), Rambus memory systems, small outline DIMM (SO-DIMM), and compression-attached memory system.

In one or more implementations, the memory system 106 is a single integrated circuit device that incorporates the memory 116 on a single chip. In some examples, the memory system 106 is formed using multiple chips of memory 116 that are vertically ("3D") stacked together, are placed side-by-side on an interposer or substrate, or are assembled via a combination of vertical stacking or side-by-side placement.

The memory 116 is a device or system that stores data, such as for immediate use in a device (e.g., by the core 108). In one or more implementations, memory 116 corresponds to semiconductor memory, where data is stored within memory cells on one or more integrated circuits. In at least one example, memory 116 corresponds to or includes volatile memory, examples of which include random-access memory (RAM), dynamic random-access memory (DRAM), synchronous dynamic random-access memory (SDRAM), and static random-access memory (SRAM). Alternatively, or in addition, memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Access to the memory system 106 for the processor 104 is controlled using the memory controller 110.

The memory setting request 112 illustrates an example instruction the memory controller 110 receives to write a specific value to a target range of memory locations (e.g., targeted addresses) in memory 116 to conceal the values these locations currently hold. The targeted addresses for the memory setting request 112 include a memory address, a range of memory addresses, or a combination thereof in the memory 116. The memory setting request 112 represents a request made by the processor 104 (e.g., by the core 108) or an operating system, hypervisor, or runtime thereof for data security. The core 108 transmits the memory setting request 112 to the memory controller 110, which causes the memory controller 110 to forward the memory setting request 112 to the memory system 106. The memory setting request 112 includes a set precharge command 114 and information describing one or more bits of data maintained in memory 116 (e.g., by specifying a memory address, a range of memory addresses, or combinations thereof) corresponding to locations in the memory system 106 at which the memory setting is to occur without including a data payload with the specific or set values. The data payload of an access request (e.g., a write request) includes the specific values the processor requests to store or write at the targeted address(es) in memory 116. Here, the memory setting request 112 instructs memory setting to occur at the targeted addresses without including the setting values in the data payload. In one or more implementations, the memory setting request 112 is initiated by the operating system, hypervisor, or runtime.

In conventional systems, a memory setting request involves issuing memory write requests to specified memory locations with the set value as a data payload for the memory write requests. The data payload incurs considerable data movement over the device 102 and causes both long latency and energy overhead to perform the memory setting operation.

Other conventional techniques utilize row clone operations to activate two rows in the memory 116 back-to-back (e.g., addresses X and Y). The sensed data from a first row (e.g., address X) is used to overwrite the data in a second row (e.g., address Y) in the memory 116. Using the row clone operation avoids moving a data payload over the device 102, but this conventional technique requires a specific row or address range to be set aside with the memory set value for each type of memory setting request.

In contrast, the described system 100 includes the set precharge command 114 in the memory setting request 112. The set precharge command 114 allows bitlines to be set to a pre-defined value (e.g., a set value of all ones). Once the set precharge command 114 is invoked, the setting hardware 118 issues a row activation command to raise the word line for the row identified in the memory setting request 112. The row activation command causes charge sharing between bitcells and bitlines causing the bitcells to be overwritten by the set precharge command 114, thus completing the memory setting request 112. In this way, a relatively simple pre-charging and row activation by the setting hardware 118 allows the memory system 106 to be set to a specified value(s).

Figure 2:
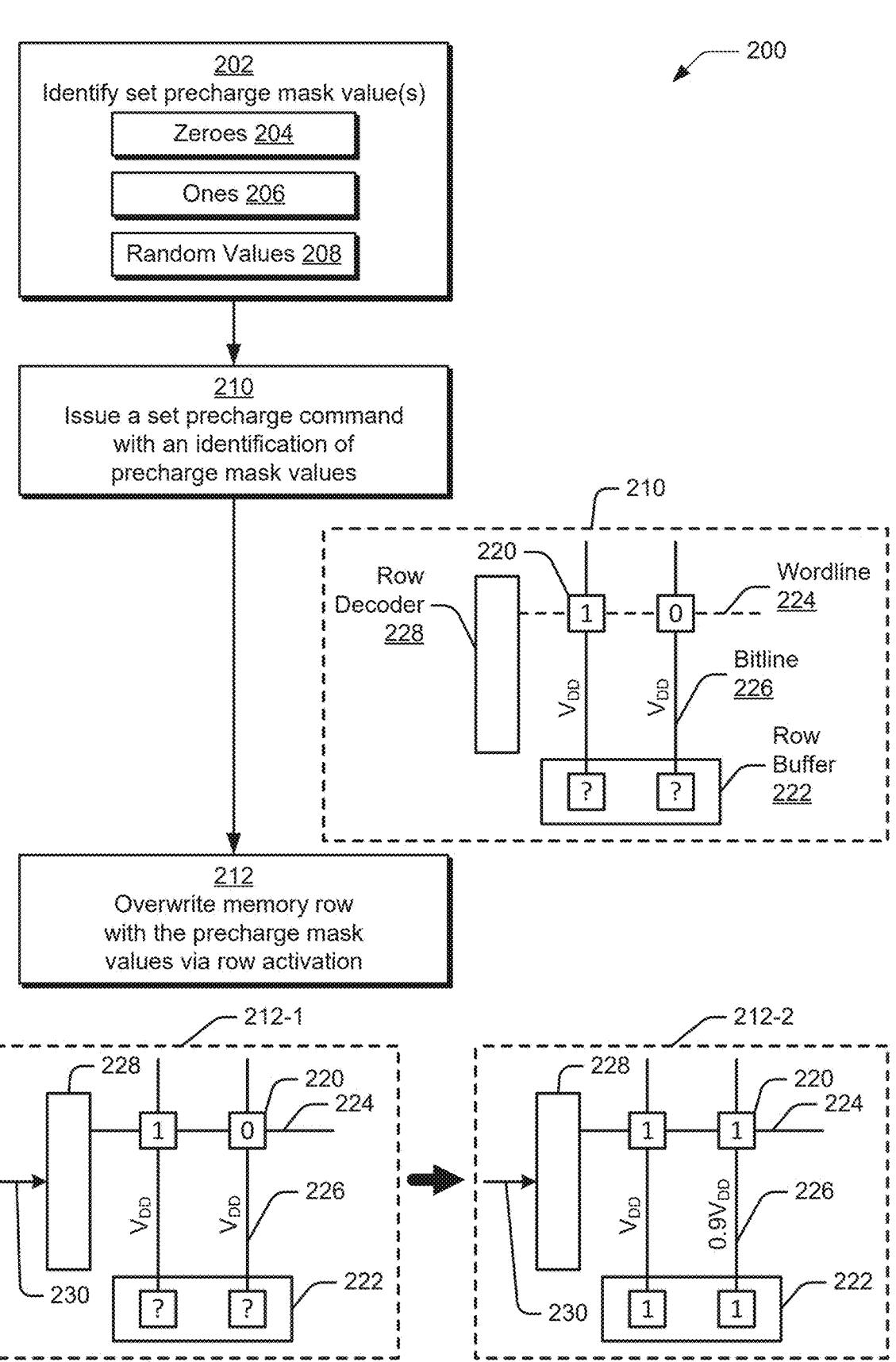
FIG. 2 is a block diagram of a non-limiting example procedure that illustrates techniques for efficient memory setting.

FIG. 2 is a block diagram of a non-limiting example procedure 200 that illustrates techniques for efficient memory setting. The procedure 200 is shown as operations (or actions) performed, but not necessarily limited to the order or combinations in which the operations are shown herein. Any one or more operations may be repeated, combined, or reorganized to provide other algorithms. In portions of the following discussion, reference may be made to the systems and components of FIG. 1, reference to which is made by example. The algorithm is not limited to performance by the mentioned systems and components.

To begin, a processing device associated with an operating system, hypervisor, or runtime compiler identifies set precharge mask values for the memory setting operation (block 202). Memory systems generally include a precharge mechanism to set voltage levels on bitlines (e.g., at half of the supply voltage or VDD/2) in the memory array. The described techniques augment this precharge mechanism for memory setting. In particular, the processor identifies the pre-defined value(s) to which the bitlines are set. The pre-defined or set values include all zeroes 204 (e.g., set value=0 s), all ones 206 (e.g., set value=1 s), random values 208 (e.g., an array of random zeroes and ones), or any combination thereof.

The described set precharge mechanism works with configurable set or mask values (e.g., all zeros, all ones, or a random or non-random combination of zeros and ones), which are configured in the memory device. The mask values are configurable by an operating system or processor via an application programming interface (API) that issues the set precharge command to a memory controller, which in turn configures the memory device.

In at least one implementation, the memory device is preconfigured with a list of commonly used precharge mask values and a mechanism to select between these preconfigured mask values. The selection mechanism selects the precharge mask values for each set precharge command or specific address ranges. Precharge mask values are configurable to a memory hierarchy or components therein (e.g., bank, channel, etc.).

The processing device then issues a set precharge command with an identification of the selected precharge mask values (block 210). Example circuitry is illustrated in FIG. 2 for issuing the set precharge command with all ones 206. In this example, bitcells 220 are set to "1" and "0" respectively and no values are currently stored in row buffer 222. The wordline 224 is not set, but the bitlines 226 are set to the selected precharge mask values (e.g., $V_{DD}$ for all ones 206).

In response to the set precharge command received from the memory controller 110, the system completes the memory setting by overwriting the specified memory row with the precharge mask values via a row activation operation (block 212). The memory row is specified in the set precharge command.

The row decoder 228 receives an indication 230 of a row address associated with the bitcells 220 to be read. As illustrated in the example circuitry for block 212-1, the row activation command raises the wordline 224 (e.g., illustrated by the solid line as opposed to the dashed line in the circuitry for block 210) for the bitcells 220 to be accessed. As illustrated in the example circuitry for block 212-2, the wordline 224 raising causes charge sharing between bitcells 220 and bitlines 226 and overwriting the bitcells 220 with the precharge mask values (e.g., all ones). In addition, the corresponding cells of the row buffer 222 are also written to the precharge mask values.

In some implementations, the memory includes processing-in-memory components to broadcast the set precharge commands (e.g., the precharge mask values and row activation commands) to multiple banks within the memory (e.g., DRAM), which further accelerates memory setting by setting rows in different banks with a single command from the processor or memory controller 110. In this manner, a relatively simple and efficient precharge and row activation operation is used to complete the memory setting.

Figure 3:
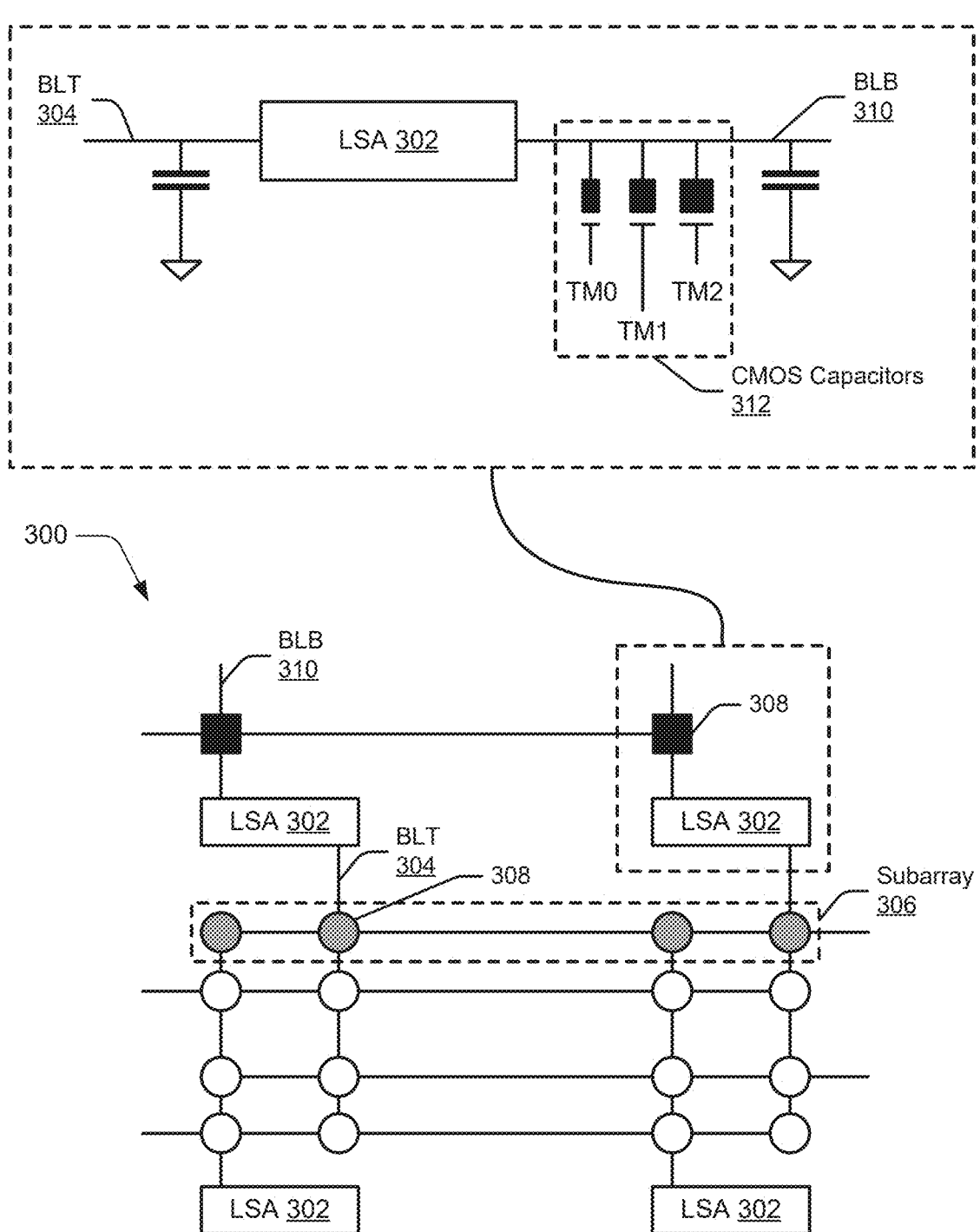
FIG. 3 illustrates example circuitry to implement techniques for efficient memory setting.

FIG. 3 illustrates example circuitry 300 to implement techniques for efficient memory setting. Circuitry 300 is an example of circuitry to write the set precharge mask values to the target memory cells. Different circuitry configurations are used in other implementations to add a bias voltage to bitlines and sense predetermined precharge mask values to implement the techniques for efficient memory setting as described herein.

DRAM circuitry generally includes multiple local sense amplifiers (LSA) 302 to detect the weak electrical signals stored in memory cells. In particular, the LSAs 302 recognize the (small) voltage difference between bitlines, amplify this voltage difference, and determine whether the amplified signals represent a logical zero or one. As illustrated in FIG. 3, each LSA 302 receives two inputs: a true bitline (BLT) from a subarray 306, including a target bitcell 308, and a bitline bar (BLB) 310 from an adjacent DRAM subarray.

Before a conventional row activation begins, both BLT 304 and BLB 310 are driven to a voltage of VDD/2 by an equalizer circuit. Before the row activation, the bitcells carry a voltage of VDD or 0V, depending on whether a '1' or '0' is stored in the corresponding bitcell. During row activation, an access transistor of the target bitcell 308 is turned on, resulting in charge sharing between the target bitcell 308 and the BLT 304. Subsequently, the target bitcell 308 drives its charge into BLT 304, until both their voltages are VDD/2+ $\Delta$VBL, which represents the voltage difference ($\Delta$VBL) between BLT 304 and BLB 310 (e.g., precharged to VDD/2). If this voltage difference ($\Delta$VBL) exceeds a threshold voltage (VTH), the LSA 302 drives BLT 304 towards VDD and BLB 310 towards 0V. When the voltage seen on BLT 304 and the target bitcell 308 is sufficiently closer to VDD, the row is closed, restoring the correct value in the target bitcell 308.

To set a precharge mask value of '0' for the described memory setting techniques, the BLB 310 is biased to a value larger than VDD/2 (e.g., VDD/2+$\alpha$). The bias '$\alpha$' is chosen such that the absolute difference between the voltage seen on BLT 304 (e.g., VDD/2+$\Delta$VBL) and BLB 310 (e.g., VDD/2+$\alpha$) is greater than the threshold voltage VTH. In other words, $\Delta$VBL–$\alpha$ is a negative value less than negative VTH, which is interpreted as '0' by the LSA 302 and drives the target bitcell 308 towards 0 V.

For the described set precharge mechanism, FIG. 3 illustrates DRAM circuit enhancements to alter the mechanisms by which the LSA 302 receives a reference voltage. To add the bias $\alpha$ to BLB 310, a small array of one or more voltage-tunable CMOS capacitors 312 is added to each BLB 310 line. In the illustrated example, the CMOS capacitors 312 include three capacitors. In other implementations, a different number of CMOS capacitors 312 are included. By enabling or disabling the CMOS capacitors 312 via setting control signals TM0, TM1, and TM2, respectively, the voltage added to BLB 310 is tunable. In an alternative implementation, the CMOS capacitors 312 replace the reference subarray (e.g., associated with BLB 310) to provide VDD/2+$\alpha$.

Figure 4:
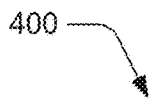
FIG. 4 is a block diagram of a non-limiting example system showing the operation of a processor core issuing a data-less write request for efficient memory setting.
Figure 4:
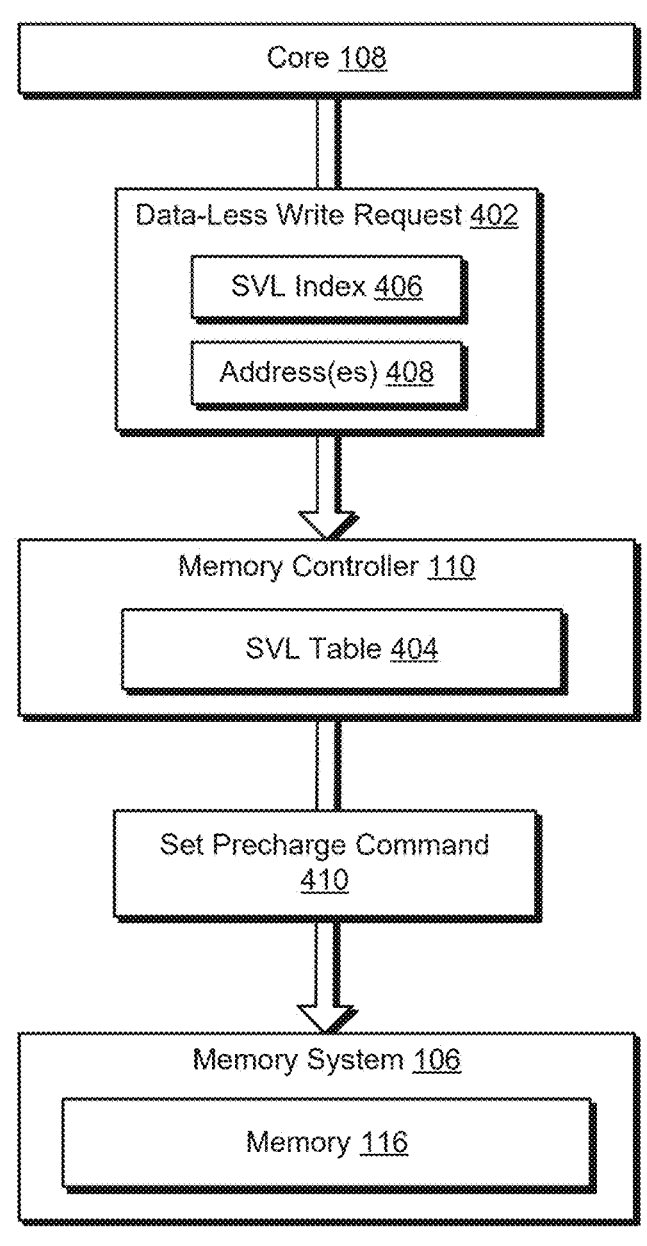

FIG. 4 is a block diagram of a non-limiting example system 400 showing the operation of a processor core issuing a data-less write request for efficient memory setting. In other words, FIG. 4 illustrates a core 108 utilizing the techniques described in this document for efficient memory setting. To do so, core 108 utilizes a data-less write request 402 that, unlike typical memory writes, does not include a data payload.

The memory controller 110 includes a set-value lookup (SVL) table 404 that maintains a list of multiple set value options (e.g., set mask values) that the memory system 106 works with. As described above, the set value options include all zeroes 204 (e.g., set value=0 s), all ones 206 (e.g., set value=1 s), random values 208 (e.g., an array of random zeroes and ones), or any combination thereof. In one implementation, the SVL table 404 is partitioned based on address ranges in memory 116. Partitioning is also based on processor identifications, processor core identifications, or process identifications in other implementations. In one example, the SVL table 404 is partitioned by address ranges by identifying a beginning and ending address for each partition or based on predetermined blocks of address spaces (e.g., 64-bit blocks). In another example, the SVL table 404 is partitioned by processor core identification, with each processor core assigned to a particular partition (e.g., a first processor core versus a second processor core). In yet another example, the SVL table 404 partitions are assigned to particular processes or threads based on address space identifiers (ASIDs) or process context identifiers (PCIDs).

The data-less write request 402 includes an SVL index 406 and addresses 408 for memory setting. The SVL index 406 identifies a specific set value in the SVL table 404 to write to the identified addresses 408 in memory 116. In alternative implementations, the data-less write request 402 does not include the SVL index 406; instead, the memory controller 110 or memory system 106 determines which set values to write to the addresses 408 (e.g., based on the addresses 408, process identification, or random ordering). The addresses 408 can include a large range of addresses, allowing the memory setting to be coupled with a row-wide set pre-charging in memory 116.

In response to receiving the data-less write request 402, the memory controller 110 configures the set value based on the SVL index 406 (or another table selection mechanism). The memory controller 110 then issues a set precharge command 410 to memory system 106 with the set mask values and addresses 408. The memory controller 110 or another component in the memory hierarchy (e.g., cache controllers) combines multiple data-less write requests 402 with contiguous addresses 408 into a coarse set precharge command 410 over the entire range of addresses (e.g., using a single set precharge command 410). The request combination also supports mask value settings with different granularities (e.g., cache blocks, memory rows, and memory columns).

In some implementations, data-less write requests 402 invalidate caches as the requests travel from the core 108 to the memory controller 110. If cache coherence permits it, the data-less write requests 402 update the cache blocks associated with the addresses 408 to the set value associated with the SVL index 406, requiring the SVL table 404 also to be included in the cache system.

Figure 5:
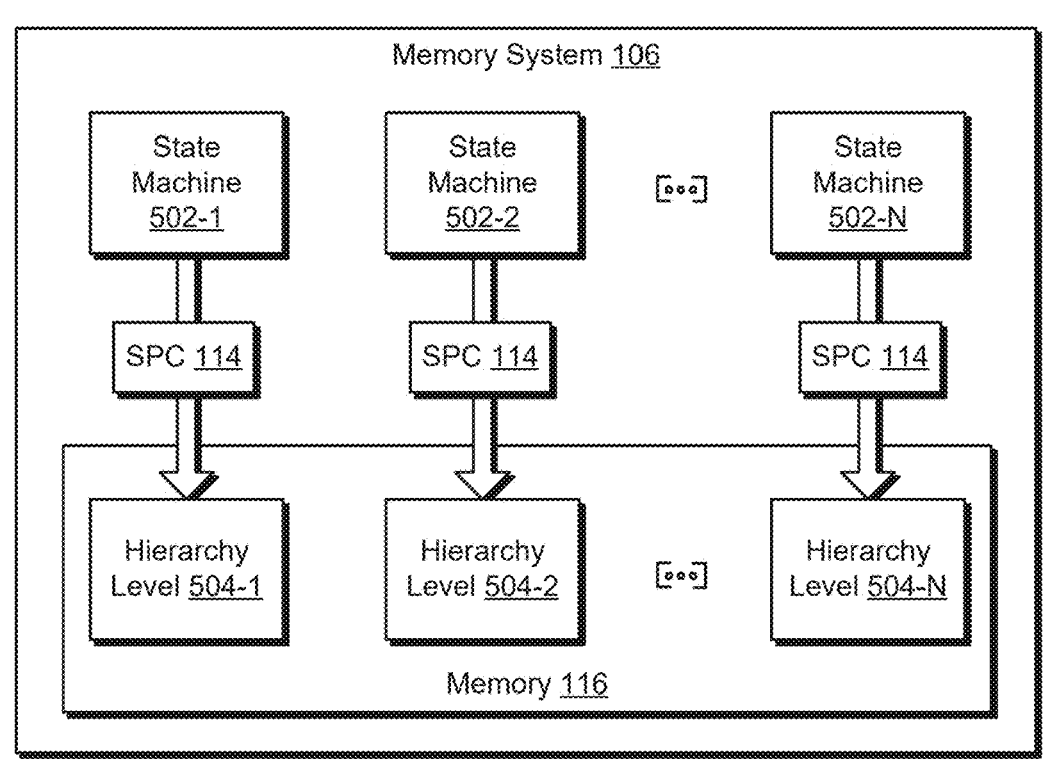
FIG. 5 is a block diagram of a non-limiting example system showing the operation of a memory system performing memory setting.

FIG. 5 is a block diagram of a non-limiting example system 500 showing the operation of a memory system performing memory setting. The system 500 includes the memory system 106 and memory 116 of FIG. 1.

The memory system 106 sets the (entire) region of memory 116 each time the memory system 106 is powered on to guard against potential cold-boot attacks. By detecting that the memory system is being powered on and issuing a set precharge command to multiple or all rows in multiple or all banks of memory 116, the memory content is erased by setting it to a predetermined value, rendering cold-boot attacks useless.

One or more state machines 502 (e.g., state machine 502-1, 502-2, and 502-N, where N is a positive integral) are placed within the memory system 106 to implement memory setting upon each power cycle. The state machines 502 (e.g., Moore machines or Mealy machines) are generally finite-state automatons or sequential logic circuits that can be in one of a finite number of states at any given time to control the behavior of the memory system 106. The state machines 502 are placed at one or more hierarchy levels 504 (e.g., per channel, per bank, per sub-array) of the memory 116. Accordingly, state machine 502-1 corresponds to hierarchy level 504-1, state machine 502-2 corresponds to hierarchy level 504-2, and state machine 502-N corresponds to hierarchy level 504-N. For example, the state machines 502 are placed at each memory bank in memory 116 in one implementation.

In response to detecting the memory system 106 is being powered on or being informed that a power-on event is occurring, a per-bank state machine 502 cycles through all rows in the corresponding bank using set precharge commands 114 to erase previous memory contents. Similarly, state machines 502 placed at different hierarchical levels in memory system 106 issue set precharge commands 114 to rows in the corresponding hierarchy levels 504. In one implementation, a channel-level state machine 502 utilizes all-bank set precharge commands 114 for further memory-setting acceleration.

While such a memory setting is in progress, the memory controller 110 blocks or delays access requests (e.g., read or write requests) from external processors or cores 108. Existing or new mechanisms to poll the readiness of the memory system 106 are made conditional on the completion of the described memory setting operations.

Figure 6:
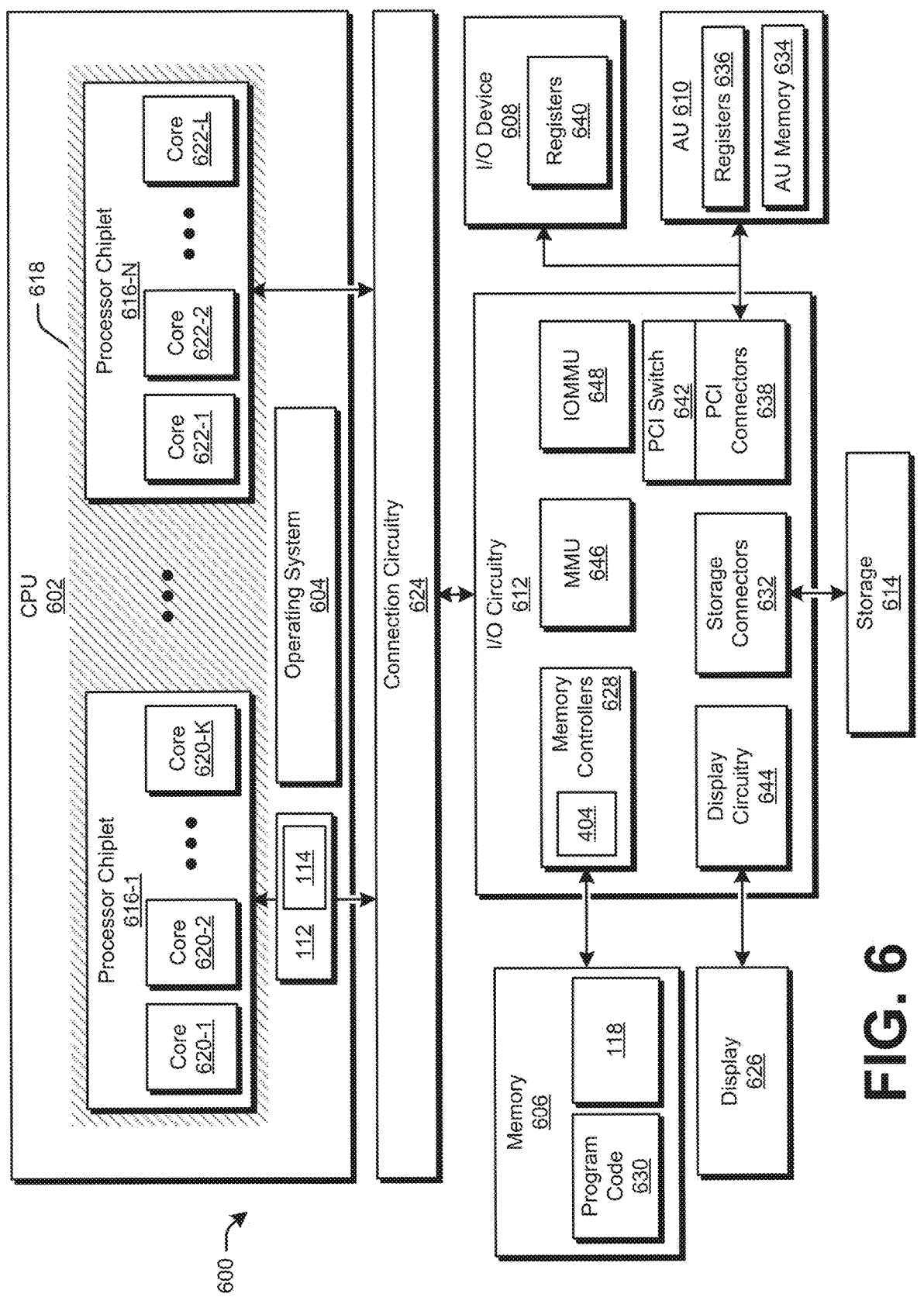
FIG. 6 is a block diagram of a processing system configured to execute one or more applications in accordance with one or more implementations.

FIG. 6 is a block diagram of a processing system configured to execute one or more applications in accordance with one or more implementations. In particular, FIG. 6 includes a processing system 600 configured to execute one or more applications, such as computing applications (e.g., machine-learning applications, neural network applications, high-performance computing applications, databasing applications, gaming applications), graphics applications, and the like. Examples of devices in which the processing system 600 is implemented include but are not limited to a server computer, personal computer (e.g., desktop or tower computer), smartphone or another wireless phone, tablet or phablet computer, notebook computer, laptop computer, wearable device (e.g., smartwatch, augmented reality headset or device, virtual reality headset or device), entertainment device (e.g., gaming console, portable gaming device, streaming media player, digital video recorder, music or another audio playback device, television, set-top box), Internet of Things (IoT) device, automotive computer or computer for another type of vehicle, networking device, medical device or system, and other computing devices or systems.

In the illustrated example, the processing system 600 includes a central processing unit (CPU) 602. In one or more implementations, the CPU 602 is configured to run an operating system (OS) 604 that manages the execution of applications. For example, the OS 604 is configured to schedule the execution of tasks (e.g., instructions) for applications, allocate portions of resources (e.g., system memory 606, CPU 602, input/output (I/O) device 608, accelerator unit (AU) 610, storage 614) for the execution of tasks for the applications, provide an interface to I/O devices (e.g., I/O device 608) for the applications, or any combination thereof.

The CPU 602 includes one or more processor chiplets 616, which are communicatively coupled by a data fabric 618 in one or more implementations. Each processor chiplet 616, for example, includes one or more processor cores 620, 622 configured to execute one or more series of instructions concurrently, also referred to herein as "threads" or workloads, for an application. Further, the data fabric 618 communicatively couples each processor chiplet 616-N of the CPU 602 such that each processor core (e.g., processor cores 620) of a first processor chiplet (e.g., 616-1) is communicatively coupled to each processor core (e.g., processor cores 622) of one or more other processor chiplets 616.

Though the example embodiment in FIG. 6 shows a first processor chiplet (616-1) having three processor cores (620-1, 620-2, 620-K) representing a K number of processor cores 622 and a second processor chiplet (616-N) having three processor cores (e.g., 622-1, 622-2, 622-L) representing an L number of processor cores 622, in other implementations (L being an integer number greater than or equal to one), each processor chiplet 616 may have any number of processor cores 620, 622. For example, each processor chiplet 616 can have the same number of processor cores 620, 622 as one or more other processor chiplets 616, a different number of processor cores 620, 622 as one or more other processor chiplets 616, or both.

Examples of connections that are usable to implement the data fabric 618 include but are not limited to buses (e.g., a data bus, a system, an address bus), interconnects, memory channels, and silicon vias, traces, and planes. Other example connections include optical connections, fiber optic connections, and/or connections or links based on quantum entanglement.

Additionally, within the processing system 600, the CPU 602 is communicatively coupled to an I/O circuitry 612 by a connection circuitry 624. For example, each processor chiplet 616 of the CPU 602 is communicatively coupled to the I/O circuitry 612 by the connection circuitry 624. The connection circuitry 624 includes, for example, one or more data fabrics, buses, buffers, queues, and the like. The I/O circuitry 612 is configured to facilitate communications between two or more components of the processing system 600 such as between the CPU 602, system memory 606, display 626, universal serial bus (USB) devices, peripheral component interconnect (PCI) devices (e.g., I/O device 608, AU 610), storage 614, and the like.

As an example, system memory 606 includes any combination of one or more volatile memories and/or one or more non-volatile memories, examples of which include dynamic random-access memory (DRAM), static random-access memory (SRAM), non-volatile RAM, and the like. To manage access to the system memory 606 by CPU 602, the I/O device 608, the AU 610, and/or any other components, the I/O circuitry 612 includes one or more memory controllers 628. The memory controllers 628, for example, include circuitry configured to manage and fulfill memory access requests issued from the CPU 602, the I/O device 608, the AU 610, or any combination thereof. Examples of such requests include read requests, write requests, fetch requests, pre-fetch requests, or any combination thereof. That is to say, the memory controllers 628 are configured to manage access to the data stored at one or more memory addresses within the system memory 606, such as by CPU 602, I/O device 608, and/or AU 610.

In this example, the memory setting request 112 with the set precharge command 114 is depicted as being communicated to the system memory 606 by a processor core 620 via the memory controllers 628 with the SVL table 404. In variations, however, the memory setting request 112 with the set precharge command 114 is communicated to the system memory 606 by another computing unit (e.g., connection circuitry 624, processor core 622, or CPU 602). The memory setting request 112 is invoked by setting hardware 118 within the system memory 606 or a subset thereof.

When an application is to be executed by processing system 600, the OS 604 running on the CPU 602 is configured to load at least a portion of program code 630 (e.g., an executable file) associated with the application from, for example, a storage 614 into system memory 606. This storage 614, for example, includes non-volatile storage such as flash memory, solid-state memory, hard disk, optical disc, or the like configured to store program code 630 for one or more applications.

To facilitate communication between the storage 614 and other components of processing system 600, the I/O circuitry 612 includes one or more storage connectors 632 (e.g., universal serial bus (USB) connectors, serial AT attachment (SATA) connectors, PCI Express (PCIe) connectors) configured to communicatively couple storage 614 to the I/O circuitry 612 such that I/O circuitry 612 is capable of routing signals to and from the storage 614 to one or more other components of the processing system 600.

In association with executing an application, in one or more scenarios, the CPU 602 is configured to issue one or more instructions (e.g., threads) to be executed for an application to the AU 610. The AU 610 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 610 includes one or more compute units that concurrently execute one or more threads of an application and store data resulting from the execution of these threads in AU memory 634. This AU memory 634, for example, includes any combination of one or more volatile memories and/or non-volatile memories, examples of which include caches, video RAM (VRAM), or the like.

In one or more implementations, these compute units are also configured to execute these threads based on the data stored in one or more physical registers 636 of the AU 610.

To facilitate communication between the AU 610 and one or more other components of processing system 600, the I/O circuitry 612 includes or is otherwise connected to one or more connectors, such as PCI connectors 638 (e.g., PCIe connectors) each including circuitry configured to communicatively couple the AU 610 to the I/O circuitry such that the I/O circuitry 612 is capable of routing signals to and from the AU 610 to one or more other components of the processing system 600. Further, the PCIe connectors 638 are configured to communicatively couple the I/O device 608 to the I/O circuitry 612 such that the I/O circuitry 612 is capable of routing signals to and from the I/O device 608 to one or more other components of the processing system 600.

By way of example and not limitation, the I/O device 608 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 608 is configured to execute one or more operations, tasks, instructions, or any combination thereof based on one or more physical registers 640 of the I/O device 608. In one or more implementations, such physical registers 640 are configured to maintain data (e.g., operands, instructions, values, variables) indicating one or more operations, tasks, or instructions to be performed by the I/O device 608.

To manage communication between components of the processing system 600 (e.g., AU 610, I/O device 608) that are connected to PCI connectors 638, and one or more other components of the processing system 600, the I/O circuitry 612 includes PCI switch 642. The PCI switch 642, for example, includes circuitry configured to route packets to and from the components of the processing system 600 connected to the PCI connectors 638 as well as to the other components of the processing system 600. As an example, based on address data indicated in a packet received from a first component (e.g., CPU 602), the PCI switch 642 routes the packet to a corresponding component (e.g., AU 610) connected to the PCI connectors 638.

Based on the processing system 600 executing a graphics application, for instance, the CPU 602, the AU 610, or both are configured to execute one or more instructions (e.g., draw calls) such that a scene including one or more graphics objects is rendered. After rendering such a scene, the processing system 600 stores the scene in the storage 614, displays the scene on the display 626, or both. The display 626, for example, includes a cathode-ray tube (CRT) display, liquid crystal display (LCD), light emitting diode (LED) display, organic light emitting diode (OLED) display, or any combination thereof. To enable the processing system 600 to display a scene on the display 626, the I/O circuitry 612 includes display circuitry 644. The display circuitry 644, for example, includes high-definition multimedia interface (HDMI) connectors, DisplayPort connectors, digital visual interface (DVI) connectors, USB connectors, and the like, each including circuitry configured to communicatively couple the display 626 to the I/O circuitry 612. Additionally, or alternatively, the display circuitry 644 includes circuitry configured to manage the display of one or more scenes on the display 626 such as display controllers, buffers, memory, or any combination thereof.

Further, the CPU 602, the AU 610, or both are configured to concurrently run one or more virtual machines (VMs), which are each configured to execute one or more corresponding applications. To manage communications between such VMs and the underlying resources of the processing system 600, such as any one or more components of processing system 600, including the CPU 602, the I/O device 608, the AU 610, and the system memory 606, the I/O circuitry 612 includes memory management unit (MMU) 646 and input-output memory management unit (IOMMU) 648. The MMU 646 includes, for example, circuitry configured to manage memory requests, such as from the CPU 602 to the system memory 606. For example, the MMU 646 is configured to handle memory requests issued from the CPU 602 and associated with a VM running on the CPU 602. These memory requests, for example, request access to read, write, fetch, or pre-fetch data residing at one or more virtual addresses (e.g., guest virtual addresses) each indicating one or more portions (e.g., physical memory addresses) of the system memory 606. Based on receiving a memory request from the CPU 602, the MMU 646 is configured to translate the virtual address indicated in the memory request to a physical address in the system memory 606 and to fulfill the request. The IOMMU 648 includes, for example, circuitry configured to manage memory requests (memory-mapped I/O (MMIO) requests) from the CPU 602 to the I/O device 608, the AU 610, or both, and to manage memory requests (direct memory access (DMA) requests) from the I/O device 608 or the AU 610 to the system memory 606. For example, to access the registers 640 of the I/O device 608, the registers 636 of the AU 610, and/or the AU memory 634, the CPU 602 issues one or more MMIO requests. Such MMIO requests each request access to read, write, fetch, or pre-fetch data residing at one or more virtual addresses (e.g., guest virtual addresses) which each represent at least a portion of the registers 640 of the I/O device 608, the registers 636 of the AU 610, or the AU memory 634, respectively. As another example, to access the system memory 606 without using the CPU 602, the I/O device 608, the AU 610, or both are configured to issue one or more DMA requests. Such DMA requests each request access to read, write, fetch, or pre-fetch data residing at one or more virtual addresses (e.g., device virtual addresses) which each represent at least a portion of the system memory 606. Based on receiving an MMIO request or DMA request, the IOMMU 648 is configured to translate the virtual address indicated in the MMIO or DMA request to a physical address and fulfill the request.

In variations, the processing system 600 can include any combination of the components depicted and described. For example, in at least one variation, the processing system 600 does not include one or more of the components depicted and described in relation to FIG. 6. Additionally, or alternatively, in at least one variation, the processing system 600 includes additional and/or different components from those depicted. The 600 is configurable in a variety of ways with different combinations of components in accordance with the described techniques.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the device 102 having the cores 108 and the memory system 106 having the memory 116) are implemented in any of a variety of different manners such as hardware circuitry, software or firmware executing on a programmable processor, or any combination of two or more of hardware, software, and firmware. The methods provided are implemented in various devices, such as general-purpose computers, processors, or processor cores. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include read-only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   a processor core configured to transmit a write request to set targeted addresses in memory to a set value, the write request not including a data payload for the set value and the set value being identified by an index identifier associated with a lookup table.

2. The system of claim 1, wherein:
   the system further comprises a memory controller communicatively coupled to the processor core, the memory controller including the lookup table as a set value lookup (SVL) table with multiple set value options; and
   the index identifier being associated with the SVL table to identify the set value.

3. The system of claim 2, wherein the SVL table is partitioned by address ranges or processor core identifications.

4. The system of claim 2, wherein the memory controller is configured to combine multiple write requests with contiguous targeted addresses into a set precharge command to the memory.

5. The system of claim 1, wherein the set value equals a random combination of ones and zeroes.

6. The system of claim 1, wherein the set value is configurable by an operating system or application running on the processor core via an application programming interface (API).

7. The system of claim 1, wherein:
   the targeted addresses include one or more complete rows in the memory; and
   the write request causes the memory to issue at least one row-wide set precharge operation with the set value.

8. A memory system comprising:
   a memory configured to store data; and
   a state machine configured to set bitcells in a targeted address range of the memory to a set value in response to a set precharge command, the set value being identified by an index identifier associated with a lookup table.

9. The memory system of claim 8, wherein the set precharge command is issued in response to detecting a power-on cycle of the memory system.

10. The memory system of claim 8, wherein the set precharge command is issued in response to receiving a set precharge command from a memory controller communicatively coupled in between the memory system and a processor core that issues a write request that does not include the set value in a data payload.

11. The memory system of claim 8, wherein the targeted address range includes each row in each bank of the memory.

12. The memory system of claim 8, wherein the state machine is further configured to issue different set values from the lookup table for different regions of the memory.

13. The memory system of claim 8, wherein the memory system includes the state machine for each channel, each bank, or each sub-array of the memory.

14. The memory system of claim 8, wherein a memory controller communicatively coupled to the memory system is configured to block or delay access requests to the memory during performance of the set precharge command.

15. The memory system of claim 8, wherein a processing-in-memory component simultaneously broadcasts the set precharge command to multiple regions of the memory.

16. The memory system of claim 8, wherein the set value equals a random combination of ones and zeroes.

17. A device comprising a memory controller configured to:

receive, from a processor core communicatively coupled to the memory controller, a write request to set targeted addresses in a memory to a set value, the write request including an index identifier associated with a lookup table indicating the set value and not including a data payload; and issue, to a memory system with the memory based on the index, a set precharge command to set the targeted addresses to the set value.

18. The device of claim 17, wherein:

the memory controller includes the lookup table as a set value lookup (SVL) table with multiple set value options; and the index identifier identifying the set value from among the multiple set value options in the SVL table.

19. The device of claim 17, wherein the set precharge command is issued in response to detecting a power-on cycle of the memory system.

20. The device of claim 17, wherein the memory controller is further configured to combine multiple write requests with contiguous targeted addresses into a set precharge command to the memory.

* * * * *